Nov. 29, 1932.   L. B. ROTH   1,889,378
DISPLAY STAND FOR LAWN MOWERS
Filed July 11, 1932   2 Sheets-Sheet 1
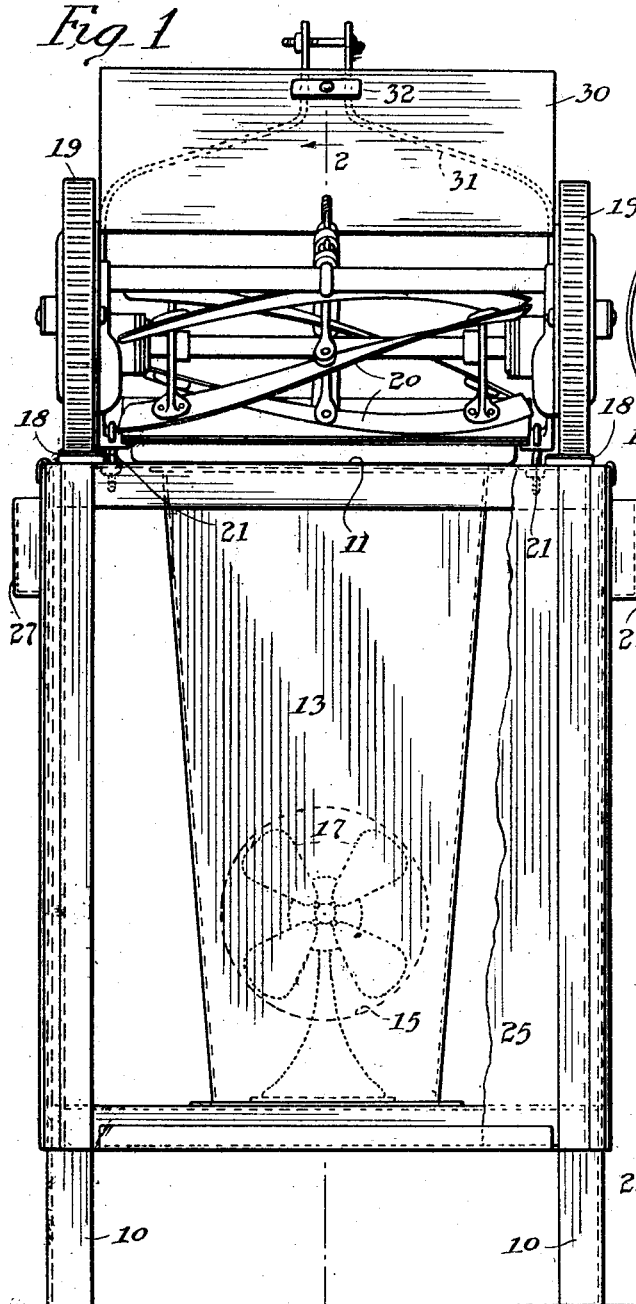
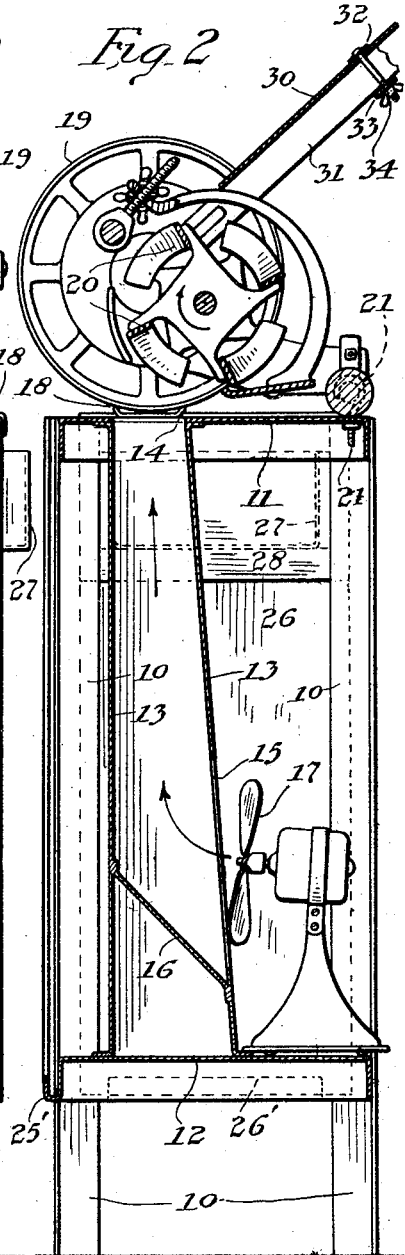
INVENTOR.
Lester B. Roth
BY Brayton Richards
ATTORNEY.

Nov. 29, 1932.  L. B. ROTH  1,889,378
DISPLAY STAND FOR LAWN MOWERS
Filed July 11, 1932   2 Sheets-Sheet 2
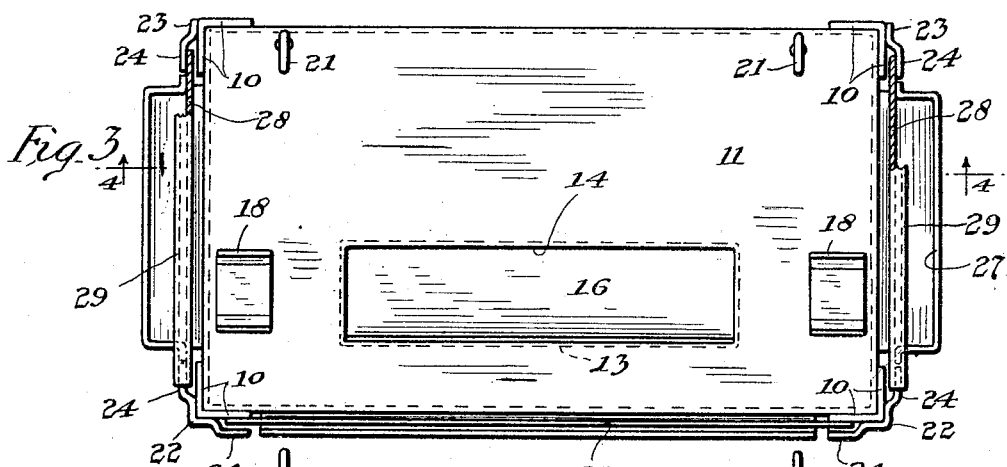
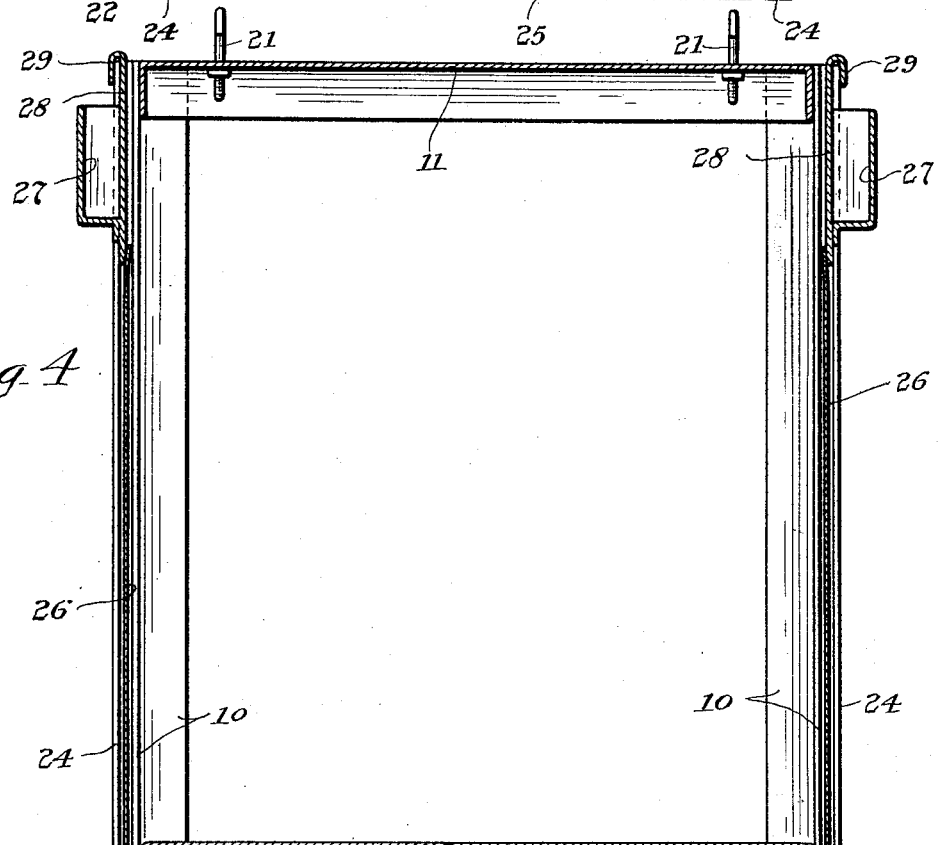
INVENTOR.
Lester B. Roth
BY
Brayton Richards
ATTORNEY.

Patented Nov. 29, 1932

1,889,378

UNITED STATES PATENT OFFICE

LESTER B. ROTH, OF PROPHETSTOWN, ILLINOIS, ASSIGNOR TO ECLIPSE LAWN MOWER COMPANY, OF PROPHETSTOWN, ILLINOIS, A CORPORATION OF ILLINOIS

DISPLAY STAND FOR LAWN MOWERS

Application filed July 11, 1932. Serial No. 621,886.

The invention relates to improvements in display stands for lawn mowers and has for its primary object the provision of an improved construction of this character especially adapted for displaying and demonstrating lawn mowers for sale purposes, which is of simple construction, economical of operation and highly efficient for the purpose indicated.

Another object of the invention is the provision of an improved stand of the character indicated having simple and effective means for imparting motion to the cutting reel of the lawn mower.

Another object of the invention is the provision of simple and effective means for adequately supporting a lawn mower on such a stand.

Another object of the invention is the provision of such a stand equipped with means facilitating advertising display in conjunction with the exhibition of the lawn mower itself.

Other objects will appear hereinafter.

The invention consists in the combinations and arrangements of parts hereinafter described and claimed.

The invention will be best understood by reference to the accompanying drawings forming a part of this specification, and in which Fig. 1 is a front view, with portions broken away, of a display stand embodying the invention and showing a lawn mower head in position thereon;

Fig. 2 a section taken substantially on line 2—2 of Fig. 1;

Fig. 3 a top plan view of the stand with the lawn mower head removed; and

Fig. 4 a transverse section of the stand taken substantially on line 4—4 of Fig. 3.

The embodiment of the invention illustrated in the drawings comprises a suitable supporting frame made up of four supporting legs 10 in the form of vertically arranged angle irons connected at their top by means of a supporting table 11 and at their lower portions by means of a supporting platform 12. An air duct 13 is arranged vertically within the forward portion of the supporting frame. This duct leads downwardly from a substantially rectangular discharge opening 14 arranged across the forward portion of the table top 11 and is provided at its lower end with a circular air entry opening 15. An upwardly and forwardly inclined baffle plate 16 is arranged as shown within the air duct 13 below and in front of the opening 15 and in position to direct a blast of air entering the opening 15 upwardly through the duct 13 as indicated. An electric fan 17 is arranged as indicated on the platform 12 in front of the opening 15 so as to direct a blast of air into and through the air duct 13. As will be noted, the air duct 13 tapers upwardly in depth, that is, in its forward and back dimension, but tapers downwardly in width, that is, in its lateral dimension, and the area of the opening 14 is substantially equal to the area of the opening 15. By this arrangement the air duct 13 is so shaped and proportioned that the full blast of air entering from the fan 17 will be directed upwardly therethrough without resistance or back pressure and without producing materially disturbing eddies or diversions of said current of air, so that a blast will be delivered through the opening 20 of sufficient intensity for the purpose indicated.

Arranged on the table top 11 at opposite sides of the opening 14 are two wheel rests 18 adapted and arranged to receive and support the wheels 19 of a lawn mower head with the cutter blades 20 positioned in substantially tangential relation with the blast of air emitted from the opening 14 so that the cutting reel of the lawn mower will be thereby revolved. The revolution of the reel of the lawn mower directs attention thereto and of course also, under the circumstances presented, demonstrates the accuracy and comparatively frictionless character of the mounting thereof, thus greatly facilitating and inducing sales.

In order to further secure the lawn mower head in place on the supporting frame, suitable clamping hooks 21 are arranged to project upwardly through the table top 11 to engage portions of the frame thereof and thereby securely clamp the lawn mower head in position on the table top.

Angle members 22 are secured as indicated around the front corners of the supporting frame, the ends of the legs of said angle irons being outwardly offset to form retaining or guide lips 24 as shown. Guide plates 23 are also secured at the rear of each side of the supporting frame, and the forward edge of each guide plate 23 is likewise outwardly offset to form a guide lip 24. Display cards 25 and 26 are arranged to be inserted as shown within the guide lips 24.

At its front and each side the platform 12 is provided with upwardly turned supporting lips 25' and 26' to receive and support the lower edges of the display cards 25 and 26. Pockets 27 for the reception and distribution of advertising circulars are also removably supported at the upper ends of the guide lips 24 at each side of the supporting frame. For this purpose the pockets 27 are arranged as shown on the outer sides of supporting plates 28 and the upper edges of said supporting plates are turned outwardly to form supporting lips 29 to engage over the upper edges of the guide lips 24, as indicated, and thereby support the pockets 27 in proper relation at each side of the supporting frame.

An additional advertising or display card 30 may be secured as shown to the handle irons 31 by means of clamping bars 32 and 33 and a clamping bolt 34 as indicated.

By this arrangement, suitable advertising and display cards may be readily mounted on the display stand on the lawn mower head and suitable advertising circulars readily dispensed in conjunction with the sale of the lawn mowers. In this manner the sales of lawn mowers will be greatly facilitated and augmented.

While I have illustrated and described the preferred form of construction for carrying my invention into effect, this is capable of variation and modification without departing from the spirit of the invention. I therefore do not wish to be limited to the precise details disclosed but desire to avail myself of such variations and modifications as fall within the scope of the appended claims.

I claim:

1. A display stand comprising a supporting frame provided with means for supporting a lawn mower; an air duct in said frame arranged to discharge air substantially tangentially against the cutter blades of the cutter reel of a lawn mower held by said supporting means; and means for discharging a blast of air through said duct against said blades.

2. A display stand comprising a supporting frame provided at its top with means for supporting a lawn mower; a vertically arranged air duct in said frame arranged to discharge air upwardly substantially tangentially against the under sides of the cutter blades of the cutter reel of a lawn mower held by said supporting means; and means for discharging a blast of air through said duct against said blades.

3. A display stand comprising a supporting frame provided with means for supporting a lawn mower; an air duct in said frame arranged to discharge air substantially tangentially against the cutter blades of the cutter reel of a lawn mower held by said supporting means; and an electric fan for injecting and discharging a blast of air into and through said duct against said blades.

4. A display stand comprising a supporting frame provided at its top with means for supporting a lawn mower; a vertically arranged air duct in said frame arranged to discharge air upwardly substantially tangentially against the under sides of the cutter blades of the cutter reel of a lawn mower held by said supporting means; and an electric fan for injecting and discharging a blast of air into and through said duct against said blades.

5. A display stand comprising a supporting frame provided at its top with means for supporting a lawn mower; a vertically arranged air duct in said frame discharging upwardly through the top of said frame through a rectangular opening arranged under the exposed cutter blades of the cutter reel of a lawn mower held by said supporting means, said duct being upwardly tapering in depth but downwardly tapering in width; and an electric fan injecting and discharging a blast of air into and through said duct against said blades.

6. A display stand comprising a supporting frame provided at its top with means for supporting a lawn mower; a vertically arranged air duct in said frame discharging upwardly through the top of said frame through a rectangular opening arranged under the exposed cutter blades of the cutter reel of a lawn mower held by said supporting means, said duct being upwardly tapering in depth but downwardly tapering in width, there being an entry opening in the rear lower side of said duct; and an electric fan injecting a blast of air into said duct through said opening.

7. A display stand comprising a supporting frame provided at its top with means for supporting a lawn mower; a vertically arranged air duct in said frame discharging upwardly through the top of said frame through a rectangular opening arranged under the exposed cutter blades of the cutter reel of a lawn mower held by said supporting means, said duct being upwardly tapering in depth but downwardly tapering in width, there being an entry opening in the rear lower side of said duct of substantially the same area as said discharge opening; and an electric fan injecting a blast of air into said duct through said opening.

8. A display stand comprising a supporting frame having a table top provided with a rectangular air discharge opening extending across the forward portion thereof; wheel rests on said table top at opposite sides of said opening adapted and arranged to support the wheels of a lawn mower, with the cutter blades of the cutter reel thereof in substantially tangential relation with said discharge opening; a vertically arranged air duct in said frame discharging upwardly through said opening, said duct being upwardly tapering in depth but downwardly tapering in width; and an electric fan injecting and discharging a blast of air into and through said duct against said blades.

9. A display stand comprising a supporting frame having a table top provided with a rectangular air discharge opening extending across the forward portion thereof; wheel rests on said table top at opposite sides of said opening adapted and arranged to support the wheels of a lawn mower, with the cutter blades of the cutter reel thereof in substantially tangential relation with said discharge opening; a vertically arranged air duct in said frame discharging upwardly through said opening, said duct being upwardly tapering in depth but downwardly tapering in width, there being an entry opening in the rear lower side of said duct; and an electric fan injecting a blast of air into said duct through said opening.

10. A display stand comprising a supporting frame having a table top provided with a rectangular air discharge opening extending across the forward portion thereof; wheel rests on said table top at opposite sides of said opening adapted and arranged to support the wheels of a lawn mower, with the cutter blades of the cutter reel thereof in substantially tangential relation with said discharge opening; a vertically arranged air duct in said frame discharging upwardly through said opening, said duct being upwardly tapering in depth but downwardly tapering in width, there being an entry opening in the rear lower side of said duct of substantially the same area as said discharge opening; and an electric fan injecting a blast of air into said duct through said opening.

11. A display stand comprising a supporting frame having a table top; wheel rests on said table top adapted to receive and position the wheels of a lawn mower; and means within said frame for discharging a blast of air against the cutter blades of said lawn mower to revolve the reel thereof.

12. A display stand comprising a supporting frame having a table top; wheel rests on said table top adapted to receive and position the wheels of a lawn mower; means within said frame for discharging a blast of air against the cutter blades of said lawn mower to revolve the reel thereof; and clamping hooks projecting upwardly from said table top and arranged to engage the frame of said lawn mower and clamp the same to said table top.

13. A display stand comprising a supporting frame provided with means for supporting a lawn mower; an air duct in said frame arranged to discharge air substantially tangentially against the cutter blades of the cutter reel of a lawn mower held by said supporting means; and means on the front and sides of said frame for supporting display cards.

14. A display stand comprising a supporting frame provided at its top with means for supporting a lawn mower; a vertically arranged air duct in said frame discharging upwardly through the top of said frame through a rectangular opening arranged under the exposed cutter blades of the cutter reel of a lawn mower held by said supporting means, said duct being upwardly tapering in depth but downwardly tapering in width; and means on the front and sides of said frame for supporting display cards.

15. A display stand comprising a supporting frame having a table top provided with a rectangular air discharge opening extending across the forward portion thereof; wheel rests on said table top at opposite sides of said opening adapted and arranged to support the wheels of a lawn mower, with the cutter blades of the cutter reel thereof in substantially tangential relation with said discharge opening; a vertically arranged air duct in said frame discharging upwardly through said opening, said duct being upwardly tapering in depth but downwardly tapering in width; and means on the front and sides of said frame for supporting display cards.

In witness whereof, I have hereunto set my hand this 6 day of July, 1932.

LESTER B. ROTH.